W. E. HODGES AND C. F. LARZELERE.
FISHING LINE REEL.
APPLICATION FILED MAR. 12, 1921.
1,398,189.
Patented Nov. 22, 1921.
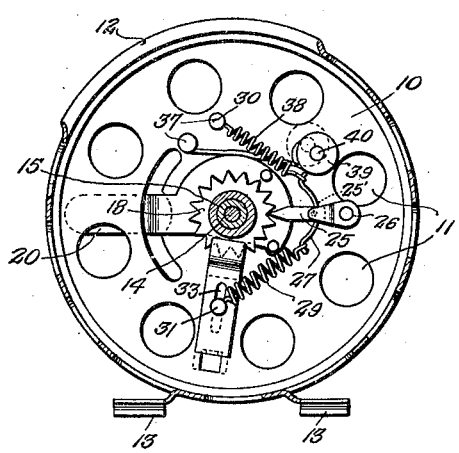
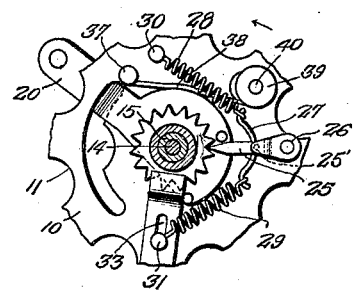
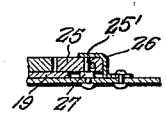
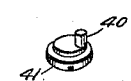
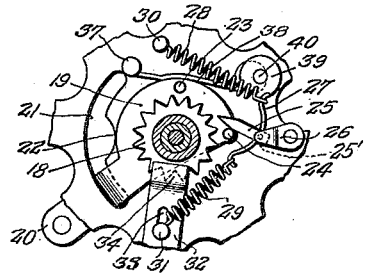
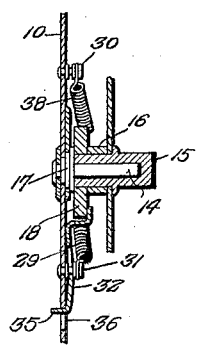
Inventor
W. E. Hodges,
C. F. Larzelere,
By
Geo. F. Kimmel
Attorney

UNITED STATES PATENT OFFICE.

WALTER E. HODGES AND CHARLES F. LARZELERE, OF FLINT, MICHIGAN.

FISHING-LINE REEL.

1,398,189.  Specification of Letters Patent.  Patented Nov. 22, 1921.

Original application filed March 25, 1920, Serial No. 368,521. Divided and this application filed March 12, 1921. Serial No. 451,920.

*To all whom it may concern:*

Be it known that we, WALTER E. HODGES and CHARLES F. LARZELERE, citizens of the United States, residing at Flint, in the county of Genesee and State of Michigan, have invented certain new and useful Improvements in Fishing-Line Reels, of which the following is a specification.

The invention relates to improvement in fishing line reels, and more particularly to a clicking mechanism therefor, which mechanism, however, is capable of use on reels of a more general nature if desired.

The principal object of the invention is to provide for a mechanism of the character mentioned, and one of an extremely simple and inexpensive construction, but which is equally as practical and efficient in application and operation on reels generally, and on known forms of fishing reels in particular.

With the foregoing and other objects in view, the invention, forming divisional subject matter of my co-pending application, filed on March 25, 1920, and serially numbered 368,521, resides in the certain new and useful construction and arrangement of parts as will be hereinafter more fully described, set forth in the appended claims, and illustrated in the accompanying drawing, in which:—

Figure 1 is a vertical section of a fishing line reel showing the embodiment of the device therewith in clicking position, and the reel tensioned for not too free rotation, Fig. 2 is a fragmentary view similar to Fig. 1, but showing the clicking mechanism set to allow rotation of the reel in one direction only, Fig. 3 is a view similar to Fig. 2, but showing the clicking mechanism set to allow free rotation of the reel as in the paying out of the line therefrom, without the clicking pawl functioning, Fig. 4 is a sectional detail showing the mounting of the pawl on one side of the reel, and its adjusting means, Fig. 5 is a sectional detail showing the operating means for the concentric tension spring, Fig. 6 is a perspective view of the concentric spring operating member, and, Fig. 7 is a sectional detail showing the assembly of one side of the reel.

Referring to the drawing, wherein similar characters of reference designate corresponding parts in the several views thereof, the numeral 10 designates one wall of a fishing reel casing having a circular series of openings 11 for ventilating the interior thereof, 12 a guard flange formed on the peripheral edge of one side wall of the casing, and 13 a pair of clips disposed at a point diametrically opposite the flange 12, by means of which the reel is to be fastened onto a rod (not shown) in the usual manner. Extending centrally of the casing is an axis 14 on which is rotatably mounted a sleeve 15 carrying a reel hub 16 between the end of which and the outwardly stepped bearing collar 17 is a ratchet wheel 18, the stepped portion of the collar 17 of greatest diameter being spaced inwardly from the opposed wall of the casing for a distance equal to the width of the intermediate stepped portion of the same, while the portion of the smallest diameter is engaged in a center bearing opening of the latter.

An adjusting element consisting of a semicircular body portion 19 having a radially extending lever arm or handle 20 is provided, and the body portion 19 is provided with an opening engaged in the intermediate portion of the collar 17 and movable thereon between the opposed faces of the adjacent wall of the casing 10 and the portion of the collar 17 of the greatest diameter. The lever or handle 20 is bent at a point intermediate its length and is projected outwardly through and movable in an arcuate slot 21 formed in the end wall of the casing 10, the free end portion of the same being disposed in slightly spaced parallel relation with respect to the outer face of the latter. A notch 22 is formed in the inner edge of the slot 21 and holds the lever or handle in its normally operative position, which position will be hereinafter more particularly referred to. Secured in the inner face of the body 19 are a pair of spaced lugs or pins 23 and 24, and between which is disposed the clicking pawl 25 pivotally supported on a pivot pin 25' fixed in the casing wall 10 and is held in operative position thereon by means of a bracket arm 26 secured to the inner face of the wall of the casing and, with the lever or handle 20 held in the notch 22, the pawl 25 is disposed in its normal clicking position, the point of the same being in engagement with the teeth of the ratchet wheel 18 for the purpose. By swinging the bracket 26 to one side, the pawl 25 may be conveniently removed from the pin 25′ for cleaning and oiling purposes.

Carried at the outer end of the pawl 25 is a bowed spring 27 which has its opposite ends each connected to one of a pair of diagonally extending coiled springs 28 and 29, the opposite ends of which are secured respectively to pins or lugs 30 and 31, which are secured in the inner walls of the casing 10 at opposite sides of the ratchet wheel 18 and the body 19. A locking plate is provided with a slot 33 by means of which it is engaged over the pin or lug 31, and the same is bent at its inner end to provide a laterally and outwardly offset portion 34 which engages the outer face of the ratchet wheel 18 to prevent displacement of the reel from within the casing 10, the hub 16 of the reel being secured on the sleeve 15 between an annular shoulder on the latter and the ratchet wheel 18.

Upon the outer end of the locking member 32 is a lug or projection 35 which extends laterally outward of a slot 36 formed in the casing wall 10, and by means of which the member may be moved radially to lock or release the reel and ratchet in the casing. Secured to a pin 37 adjacent one end of the slot 21 is one end of a spring 38 which bears against the edge of the body 19, the other end engaged in a groove formed in the periphery of a roller 39, which is concentrically mounted on a pin or stud 40 in the casing wall 10. Projecting laterally outward from the roller 39 is an eccentrically disposed pin or lug 40 which extends through an opening in the wall of the casing and carries on its outer end a finger piece 41. Manipulation of the finger piece 41 rotates the roller 39 and increases or decreases the tension of the spring 38 with respect to the member or body 19 whereby to govern the freedom of movement of the latter.

In operation, the adjusting member or body 19 is normally set for "clicking" action, as illustrated in Fig. 1, in which position the pins 23 and 24 are held spaced equidistantly to either side of the pawl 25 with the latter in engagement with the ratchet wheel 18, whereby the reel may be rotated in either direction about its axis, and, when so rotated, the ratchet is also rotated in clicking action with the pawl 25, in which case, however, the rotation of the reel and ratchet is slightly retarded in both directions of such rotation. When it is desired to pay out the fishing line from the reel, as in trolling, the adjusting member or body 19 is oscillated by moving the lever or handle to the end of the slot 21, as in Fig. 3, so that the pin 30 engages the pawl 25 and moves it out of engagement with the teeth of the ratchet, in which position the reel is freely rotatable in both directions. By moving the lever or handle 20 to the opposite end of the slot 21, as shown in Fig. 2, the adjusting member or body 19 is oscillated so that the pin 23 engages the pawl 25, the latter being not wholly disengaged from the ratchet 18, but is moved only sufficiently to admit of the reel being rotated in one direction only, the pawl 25 being held by the pin 23 against displacement and against clicking action. However, if the pressure exerted upon the reel, in the direction of its rotation, is sufficient to overcome the tension of the spring 38, the pawl 25 will automatically return or be reset to clicking position. This last operative position of the parts of the reel is often used by fishermen, when it is desired that the weight of the fish, or its pull on the line, indicates its presence on the line and as having actually been hooked.

Having thus fully described the invention, what is claimed, is:—

1. In a device of the class described, a casing, a reel mounted in said casing, a clicking means associated with said reel, means for rendering said clicking means inoperative for the rotation of said reel in both directions of movement, and means for rendering said clicking means inoperative for the rotation of said reel in one direction only, said last mentioned means being operable by the pull on the line of a caught fish whereby to automatically return said clicking means to operative position.

2. In a device of the class described, a casing, a reel mounted in said casing, a clicking means associated with said reel, means for tensioning said clicking means in normally operative position, means for rendering said clicking means inoperative for the rotation of said reel in both directions of movement, and means for rendering said clicking means inoperative for the rotation of said reel in one direction only, said last mentioned means being operable by the pull on the line of a caught fish whereby to automatically return said clicking means to operative position.

3. In a device of the class described, a casing, a reel mounted in the casing, a ratchet wheel carried by the reel, a pawl pivoted on the casing, springs for holding the pawl in loose engagement with the ratchet to effect clicking action of the reel, and pins movable into engagement with the pawl for releasing the same from the ratchet and for moving the same into one way binding action of the ratchet in different directions of their movement.

4. In a device of the class described, a casing, a reel mounted in the casing, a ratchet wheel carried by the reel, a pawl pivoted on the casing, springs for holding the pawl in loose engagement with the ratchet to effect clicking action of the reel, a control lever mounted in the casing, a pin on the control lever for contact with the pawl to remove the same from engagement with the ratchet, a pin on the control lever for engaging the pawl for moving the same into engagement with the ratchet to permit rotation of the reel in one direction only, and an eccentrically mounted finger engaging member for adjusting the action of said control lever.

5. In a device of the class described, a casing, a reel removably and rotatably mounted in the casing, a ratchet wheel carried by the reel, a pawl pivoted on the casing, springs for holding the pawl in loose engagement with the ratchet to effect clicking action of the reel, a control lever mounted in the casing, a pin on the control lever for contact with the pawl to move same from engagement with the ratchet, a pin on the control lever for engaging the pawl for moving the same into engagement with the ratchet to permit rotation of the reel in one direction only, an eccentrically mounted finger engaging member for adjusting the action of the control lever, and means for effecting the pawl in its last mentioned position whereby to return the same automatically to clicking action with said ratchet.

In testimony whereof, we affix our signatures hereto.

WALTER E. HODGES.
CHARLES F. LARZELERE.